US007035167B2

(12) United States Patent
Pakhomov et al.

(10) Patent No.: US 7,035,167 B2
(45) Date of Patent: Apr. 25, 2006

(54) SEISMIC SENSOR

(75) Inventors: Alexander Pakhomov, Yonkers, NY (US); Tim Goldburt, Chappaqua, NY (US)

(73) Assignee: General Phosphorix, Ardsley, NY (US)

( * ) Notice: Subject to any disclaimer, the term of this patent is extended or adjusted under 35 U.S.C. 154(b) by 0 days.

(21) Appl. No.: 10/659,298

(22) Filed: Sep. 11, 2003

(65) Prior Publication Data

US 2005/0058024 A1    Mar. 17, 2005

(51) Int. Cl.
*G01V 1/18* (2006.01)
*G01V 1/16* (2006.01)

(52) U.S. Cl. .............. 367/181; 367/174; 367/176; 367/178; 181/122

(58) Field of Classification Search .......... 367/162, 367/163, 165, 170, 174, 176, 181, 178; 181/112, 181/122; 381/174, 191
See application file for complete search history.

(56) References Cited

U.S. PATENT DOCUMENTS

| 3,709,042 A * | 1/1973 | Lee et al. ............... 73/514.13 |
| 4,041,446 A * | 8/1977 | Liebermann ............. 367/181 |
| 4,329,547 A * | 5/1982 | Imai ..................... 381/163 |
| 4,910,840 A * | 3/1990 | Sprenkels et al. ......... 29/25.41 |
| 5,097,515 A * | 3/1992 | Baba .................... 381/191 |
| 5,146,435 A * | 9/1992 | Bernstein ................ 367/181 |
| 5,209,117 A * | 5/1993 | Bennett ................. 73/514.16 |
| 5,255,246 A * | 10/1993 | van Halteren ............ 367/170 |
| 5,335,286 A * | 8/1994 | Carlson et al. ........... 381/191 |
| 5,400,298 A * | 3/1995 | Hepp .................... 367/20 |
| 5,570,428 A * | 10/1996 | Madaffari et al. ......... 381/191 |
| 6,028,423 A * | 2/2000 | Sanchez ................. 324/96 |
| 6,169,810 B1 * | 1/2001 | van Halteren et al. ...... 381/174 |
| 6,178,249 B1 * | 1/2001 | Hietanen et al. .......... 381/174 |
| 6,498,854 B1 * | 12/2002 | Smith .................... 381/67 |
| 6,661,897 B1 * | 12/2003 | Smith .................... 381/67 |
| 6,694,032 B1 * | 2/2004 | Yun et al. ............... 381/174 |

* cited by examiner

*Primary Examiner*—Ian J. Lobo
(74) *Attorney, Agent, or Firm*—I. Zborovsky

(57) ABSTRACT

A seismic sensor, has a case, a pre-charged, non-conductive membrane located between two plates that form a capacitor and accommodated inside the case, with one of the plates being immovable relative to the case and the other of the plates being movable relative to the one plate under the action of seismic activity of a medium in which the sensor is located, so that the capacitor produces an electrical signal responsive to the seismic activity, and a mass increasing element associated with the movable plate so as to increase mass of the movable plate and therefore enhance oscillations of the movable plate under the action of the seismic activity.

7 Claims, 1 Drawing Sheet

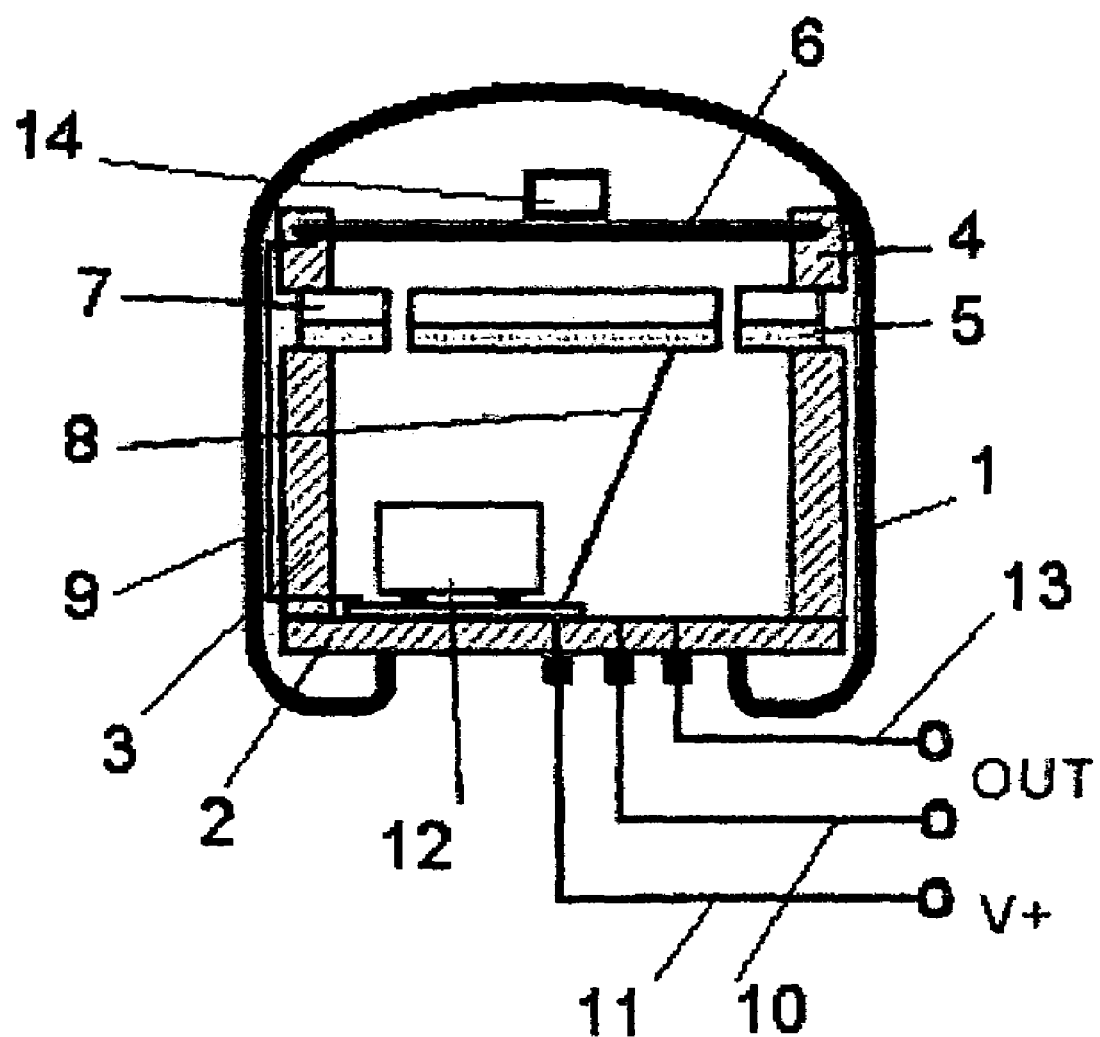

SEISMIC SENSOR

BACKGROUND OF THE INVENTION

The present invention relates generally to seismic sensors. More particularly, it relates to electromagnetic seismic sensors. Electromagnetic seismic sensors are known in the art. One of the known electromagnetic seismic sensors includes a core with a winding which is movable in an electromagnetic field under the action of seismic activity, so that a corresponding electrical signal is produced and detected, which is indicative of the seismic activity. It is believed that the existing seismic sensors of the above mentioned general type can be further improved.

SUMMARY OF THE INVENTION

Accordingly, it is an object of the present invention to provide a seismic sensor which is a further improvement of the existing seismic sensors.

In keeping with these objects and with others which will become apparent hereinafter, one feature of the present invention resides, briefly stated, in a seismic sensor which has a pre-charged, non-conductive membrane which is located between two plates that form a capacitor, wherein one of the plates is fixed, while the other plate moves under the action of seismic activity, and an additional element which increases mass of the movable plate is provided.

When the seismic sensor is designed in accordance with the present invention, it has a very small volume, exhibits extremely high noise, immunity from electromagnetic interference, has increased sensitivity threshold and footstep detection range in low noise areas, and also has increased accuracy in footstep detection range.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing a cross-section of a seismic sensor in accordance with the present invention.

DESCRIPTION OF THE PREFERRED EMBODIMENTS

A seismic sensor in accordance with the present invention has a case which is identified with reference numeral 1. A lower support including a bottom plate 2 and a lower bush 3, and an upper support formed as an upper bush 4 are located in the case and immovably connected with the case, for example by glueing, welding, etc.

The sensor further has two plates 5 and 6 which together form a capacitor. The plate 5 is immovable relative to the support and therefore relative to the case of the sensor, while plate 6 is movable relative to the plate 5. For example, the plate 6 is formed as a flexible diaphragm. A pre-charged, non-conductive membrane 7 is located between the plates 5 and 6. It can be composed, for example, from electret.

The plates 5 and 6 of the capacitor are electrically connected with the electronic unit 12 by conductors 8 and 9. Electronic unit 12 is connected with an electrical power supply through conductors 10 and 11.

The sensor is further provided with the element 14 which locally increases the mass of the plate 6 which is formed as a diaphragm. The mass increasing element 13 can be formed for example, as a lug, which can be located centrally of the plate 6.

As can be seen from the drawings the lug is formed as a single lug arranged on the flexible diaphragm formed by the plate 6 and having a transverse size which is significantly smaller than the transverse size of the diaphragm which is formed as a single diaphragm.

The electronic unit 12 can include an operational amplifier with high impedance input and any resistance and capacitance. The amplifier also place the role of an active filter. For protection from the electromagnetic interference the case 1 of the sensor can be formed as a double shield, with one shield composed of copper and the other shield composed of nickel. The double shield is needed in the case when the electromagnetic interference is very high. In other cases it is sufficient to use a single shield. The electromagnetic unit provides signal buffering, filtering, self-biasing, and external fandom biasing.

The sensor in accordance with the present invention operates in the following manner.

When the seismic sensor is accommodated in medium subjected to seismic activity, for example in the ground, then under the action of the seismic activity the sensor moves as a whole and the diaphragm 6 oscillates relative to the plate 5. The oscillations of the plate 6 are significantly enhanced by the mass increasing element 14.

The electrical signals produced by the capacitor 5, 6 are received in the electronic unit 12 which processes the signals and outputs an output signal indicative of the seismic activity detected by the seismic sensor, which is then to be evaluated.

It will be understood that each of the elements described above, or two or more together, may also find a useful application in other types of constructions differing from the types described above.

While the invention has been illustrated and described as embodied in seismic sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A seismic sensor for sensing seismic activity, comprising a case; a pre-charged, non-conductive membrane located between two plates that form a capacitor and accommodated inside said case, with one of said plates being immovable relative to said case and the other of said plates being movable relative to said one plate under the action of seismic activity of a medium in which the sensor is located, so that said capacitor produces an electrical signal responsive to the seismic activity, said movable plate being formed as a single uninterrupted flexible diaphragm extending transversely over a total transverse cross-section of said case, so that under the action of seismic activity when the sensor moves as a whole said diaphragm oscillates as a whole relative to said immovable plate; and a mass increasing element associated with said movable plate so as to increase mass of said diaphragm and therefore enhance oscillations of said diaphragm under the action of the seismic activity, said mass increasing element being formed as a single lug which is attached to said single uninterrupted flexible diaphragm in a center of said single uninterrupted flexible diaphragm and is displaceable together with said flexible diaphragm in response to the movement of the sensor as a whole under the action of seismic activity.

2. A seismic sensor as defined in claim 1; and further comprising an electronic unit which is connected with said capacitor.

3. A seismic sensor as defined in claim 2, wherein said electronic unit including an operational amplifier with high impedance input and a resistance, and a capacitance.

4. A seismic sensor as defined in claim 1, wherein said case is formed as a double shield for protection from electromagnetic interference.

5. A seismic sensor as defined in claim 4, wherein said double shield includes one shield composed of copper and another shield composed of nickel.

6. A seismic sensor as defined in claim 1, wherein said pre-charged non-conductive membrane is composed of an electret.

7. A seismic sensor for sensing seismic activity, comprising a case; a pre-charged, non-conductive membrane located between two plates that form a capacitor and accommodated inside said case, with one of said plates being immovable relative to said case and the other of said plates being movable relative to said one plate under the action of seismic activity of a medium in which the sensor is located, so that said capacitor produces an electrical signal responsive to the seismic activity, said movable plate being formed as a single uninterrupted flexible diaphragm extending transversely over a total transverse cross-section of said case, so that under the action of seismic activity when the sensor moves as a whole said diaphragm oscillates as a whole relative to said immovable plate; and a mass increasing element associated with said movable plate so as to increase mass of said diaphragm and therefore enhance oscillations of said diaphragm under the action of the seismic activity, said mass increasing element being formed as a single lug which is attached to said single uninterrupted flexible diaphragm in a center of said single uninterrupted flexible diaphragm and is displaceable together with said flexible diaphragm in response to the movement of the sensor as a whole under the action of seismic activity, said single lug being formed as a single one-piece integral element having a transverse size which is substantially smaller than a transverse size of said flexible diaphragm.

* * * * *